United States Patent [19]
Pascal et al.

[11] Patent Number: 5,562,224
[45] Date of Patent: Oct. 8, 1996

[54] MULTIPURPOSE PLASTIC CONTAINER WHICH CAN BE FOLDED UP AND IS RE-USABLE AND STACKABLE

[75] Inventors: Jacky Pascal, 6 impasse du Tupinier, 69290 Grezieu La Varenne; Philippe Pascal, Montluel, both of France

[73] Assignees: Cartonnages des Monts du Lyonnais; Jacky Pascal, both of France

[21] Appl. No.: 317,863

[22] Filed: Oct. 4, 1994

[30] Foreign Application Priority Data

Oct. 7, 1993 [FR] France .................... 93 12152

[51] Int. Cl.⁶ .................... B65D 5/02; B65D 5/32
[52] U.S. Cl. .................... 220/4.33; 220/6; 220/7; 220/902; 206/508; 206/509; 229/917
[58] Field of Search .................... 220/6, 7, 902, 220/4.33, 682; 229/915, 917; 206/508, 509

[56] References Cited

U.S. PATENT DOCUMENTS

| | | | |
|---|---|---|---|
| 1,661,161 | 3/1928 | Beougher | 220/6 |
| 2,515,876 | 7/1950 | Kauffman | 220/6 X |
| 2,989,226 | 6/1961 | Swartz | 229/41 |
| 3,079,058 | 2/1963 | Russell | 229/917 |
| 3,360,180 | 12/1967 | Venturi | 220/6 X |
| 3,497,127 | 2/1970 | Box | 220/6 X |
| 3,900,157 | 8/1975 | Roth | 220/7 X |
| 3,955,703 | 5/1976 | Zebarth | 220/7 X |
| 3,968,895 | 7/1976 | Barnes, Jr. et al. | 220/7 X |
| 4,461,137 | 7/1984 | Wood | 53/456 |
| 4,673,087 | 6/1987 | Webb | 206/600 |
| 4,730,748 | 3/1988 | Bane | 220/902 X |
| 4,887,874 | 12/1989 | Joffe | 220/7 X |
| 5,361,923 | 11/1994 | Knight IV, et al. | 220/6 |

FOREIGN PATENT DOCUMENTS

| | | | |
|---|---|---|---|
| 619251 | 5/1961 | Canada | 206/508 |
| 0277919 | 1/1988 | European Pat. Off. . | |

*Primary Examiner*—Sue A. Weaver
*Attorney, Agent, or Firm*—Harris Beach & Wilcox

[57] ABSTRACT

A plastic reusable container that can be collapsed into a small package for storage.

8 Claims, 3 Drawing Sheets

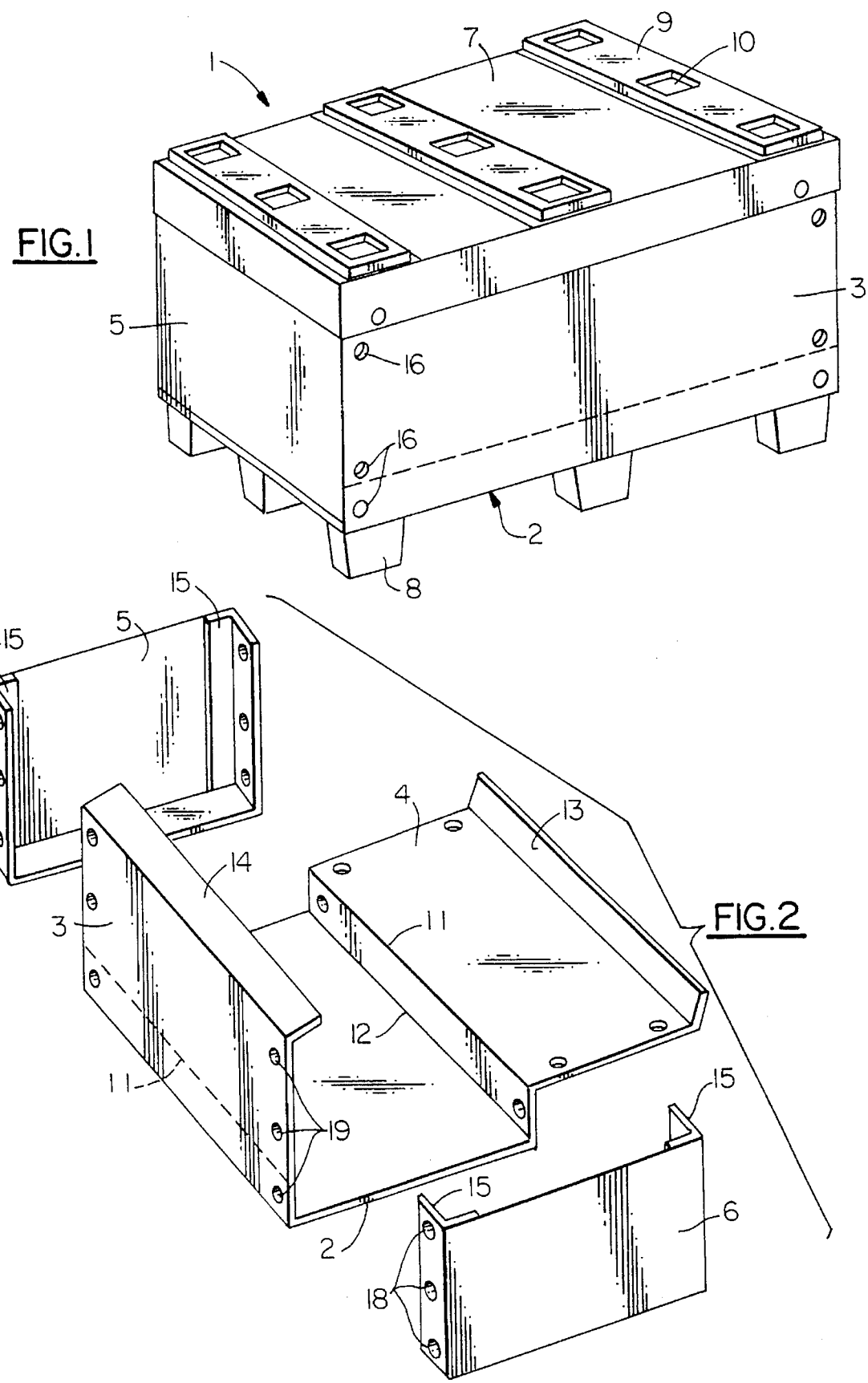

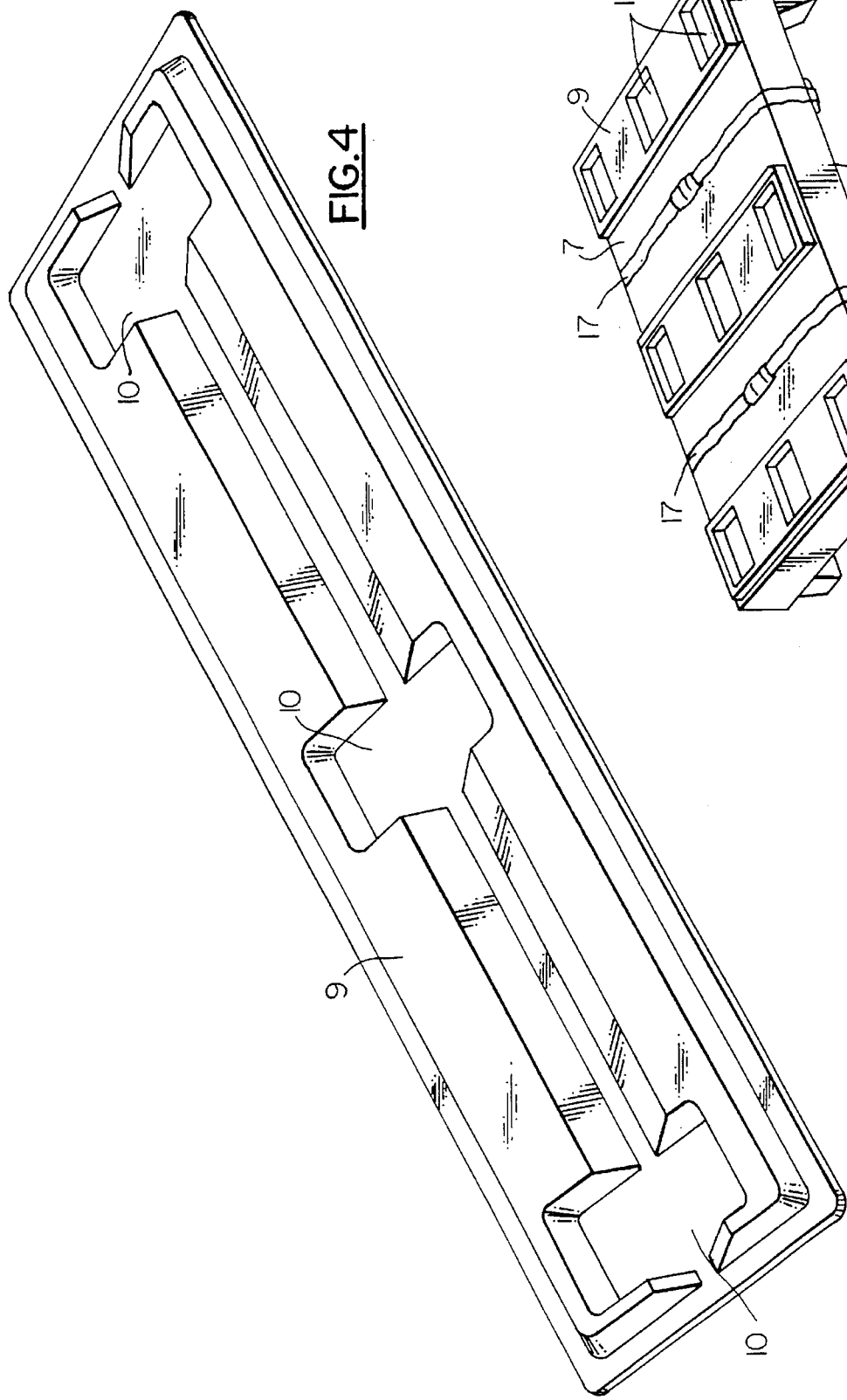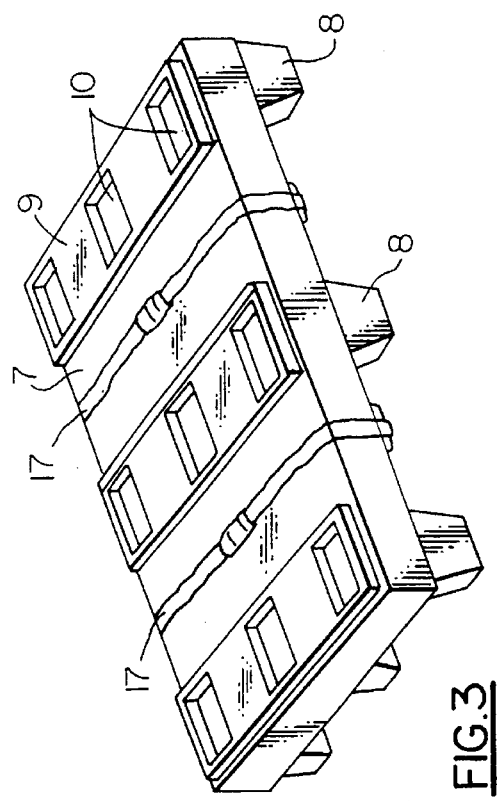

MULTIPURPOSE PLASTIC CONTAINER WHICH CAN BE FOLDED UP AND IS RE-USABLE AND STACKABLE

BACKGROUND OF THE INVENTION

The invention relates to a container made of plastic, or of a plastic/wood complex, capable of receiving any type of product, prepackaged or powdery products, or even liquids.

This container is capable of being folded up on itself so as to decrease its overall size and to provide a saving in storage space of approximately six times its volume when it is transported empty. It is therefore also capable of being re-used and is furthermore stackable, on account of the requirements related to the transportation of foodstuffs, when said package is assembled.

Many types of package are known to date which are capable of being folded up, of being stacked and of being re-used. These packages are conventionally produced from cardboard, and their assembly or, on the contrary, their folding-up, is effected very easily in the region of the folding lines defining the edges of said package.

However, on the one hand, this type of cardboard package is not proof against trickling especially of liquids, and, on the other hand and especially, it does not impart to assemblies of cardboard containers, stacked on top of each other, sufficient stability which is increasingly sought nowadays.

Packages produced from plastic have therefore being proposed which are themselves possibly leaktight and stackable much more easily than cardboard containers, since it is possible to produce, by molding or thermoforming, orifices intended to receive feet which are either added or result from the molding. On the other hand, they cannot be folded up and consequently the overall space which they take up, when the empty packages have to be returned to the loading site, significantly increases the cost of returning.

In order to overcome this drawback, a plastic package has been proposed, for example in the document U.S. Pat. No. 4,673,087, the various walls of which are produced especially by extrusion, said walls being joined together by means of metal corner pieces.

The side walls defining this package are received, on the one hand, in a base also produced from plastic, the lid fitting over the side walls, said lid also being made of plastic. Moreover, the lid is equipped with reception orifices intended to receive the feet with which the base is equipped, and this is done so as to permit stable stacking of these packages on top of each other.

However, this type of container has an appreciable weight, especially inherent in the use of metal corner pieces, and, furthermore, its assembly, although not requiring special skills, causes a non-negligible loss of time.

SUMMARY OF THE INVENTION

The invention aims to provide a multipurpose package which overcomes these various drawbacks and which is simple both to assemble and to fold up, without creating too great a loss of time.

This multipurpose container produced from plastic, which can be folded up and is re-usable and stackable, of parallelepipedal shape, includes a bottom or base, as well as four side faces and a removable lid. This container is one wherein two of the opposite side faces, and the bottom or base, stem from the same sheet of plastic and form a continuous subassembly, said subassembly having two folding zones, made substantially in the lower region of said opposite side faces, and wherein the two other opposite side faces are reversibly attached to the subassembly thus formed, especially by interlocking, the container being thus kept opened out and assembled by interaction of the interlockable lid on the entire unit thus produced.

In other words, the invention consists in producing a plastic container which can be folded up, without recourse to elements external to the package of the actual container.

According to one advantageous characteristic of the invention, the bottom or base of the container includes laths of wood or of a strong material, these laths being surrounded by the plastic sheet forming the continuous subassembly and glued or fixed to them. Thus, a degree of rigidity is imparted to the bottom, while still having a low-mass package.

According to an important characteristic of the invention, the two opposite side faces, other than those forming the subassembly called "bottom" subassembly, have a folded-back part on each of the edges of the plastic sheet of which they are composed, in such a way as to form vertical reinforcements capable of preventing said container from buckling, especially during stacking.

The side edges of these two faces may advanageously be equipped with corner pieces, also produced from plastic, prior to the gluing, after folding back the side ends of the plastic sheet from which they are formed. Thus the buckling strength of the package is increased.

According to another characteristic of the invention, the reversible fixing of said two opposite side faces to the "bottom" subassembly, formed by the two opposite main side faces and the bottom, is furthermore optimized by installing screws or pivoting fasteners made of plastic, these being secured at suitable orifices produced beforehand in the faces in question and providing sufficient pressure to confer on the package good tightness with respect to trickling.

According to another characteristic of the invention, the lid receives, especially by gluing, elements produced from plastic, especially by thermoforming, defining uniformly distributed offset cups intended to interact with feet which are likewise distributed and secured, especially by gluing, to the outer face of the bottom of the upper package, in a corresponding manner, and this is so as to enable these packages to be stably stacked on top of each other.

According to another characteristic of the invention, a sheet of expanded polystyrene, or of a complex comprising expanded polystyrene and a film of dielectric plastic, is adjoined to the inner face of the bottom, of the side faces and of the lid by gluing, in such a way as to confer isothermal properties on the package thus produced.

BRIEF DESCRIPTION OF THE DRAWINGS

The manner in which the invention may be produced and the advantages which stem therefrom will become more apparent from the illustrative embodiment which follows, given by way of indication and implying no limitation, in support of the appended figures.

FIG. 1 is a diagrammatic perspective representation of the assembled package in accordance with the invention.

FIG. 2 is an exploded view of the package in accordance with the invention, in the course of being assembled.

FIG. 3 is a diagrammatic perspective representation of the folded-up package according to the invention.

FIG. 4 is a diagrammatic representation of an embodiment of a device attached to the lid enabling the package to be stacked.

FIG. 5 is a diagrammatic representation, seen from above, of a fastener or closure member according to the invention, of which

DESCRIPTION OF THE INVENTION

Figure 5:
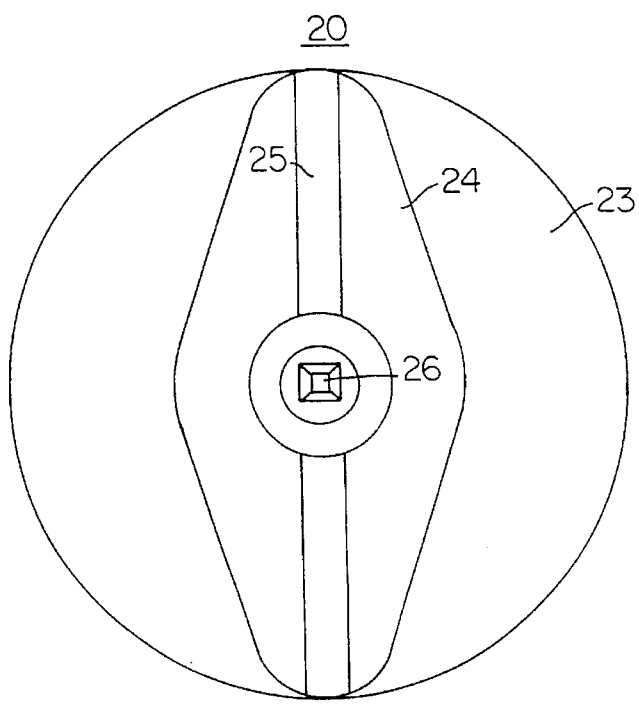

As may be seen in FIG. 1, the container (1) is of parallelepipedal shape and basically includes two main side faces (3) and (4), two secondary end faces (5) and (6), a bottom or bottom wall (2) and a lid (7).

All these elements forming the package or the container are produced from plastic and, more particularly, from polypropylene.

According to a basic characteristic of the invention, the subassembly, formed by the two main side faces (3) and (4) and the bottom (2), constitutes a whole, without discontinuity, produced from the same sheet of polypropylene, and hereinafter called the bottom subassembly.

In fact, this subassembly has two base folds (12) defining the bottom (2) with respect to said main side faces (3, 4), but also two additional folds (11), located in the lower zone of the main side faces (3) and (4), in such a way, as will be shown subsequently, as to enable said side faces to be folded over against the bottom (2) in order to end up with the package completely folded up.

Advantageously, the bottom (2) is stiffened by the installation of wooden laths, these being glued to that part of the polypropylene sheet that corresponds to the bottom and is covered by flaps (not represented), also stemming from said polypropylene sheet, which flaps are glued to said laths.

In addition, as may be seen in FIG. 1, the bottom (2) receives feet (8) advantageously thermoformed and glued to the outer face of said bottom. These feet (8) have the same shape, are uniformly distributed and, within the framework described, are nine in number, in three rows of three.

According to another characteristic of the invention, the secondary end walls (5) and (6) each stem from a polypropylene sheet and are intended to interlock internally, or to fit together into the subassembly formed by the two main side faces and the bottom (2).

At the same time, each of the side edges of said walls (5) and (6) is reinforced (15) by the polypropylene sheet, forming said walls, being folded back on itself. This folding-back of the edges is followed by a step of gluing them against the face inquestion, thus confering, on each of the lateral uprights of end walls (5) and (6), resistance to bending or to buckling, inherent in the beam effect thus created, and enabling the assembled package to develop the ability to be stacked without running the risk of said packages collapsing.

When it is desired to increase this ability to withstand buckling, corner pieces, also produced from plastic, are adjoined in the folded-back zones (15), increasing the stiffening of the side edges of said end walls. The edges of the polypropylene sheet forming the end walls (5, 6) are then folded down and then glued to the corner pieces.

These secondary end walls (5) and (6) are installed on the subassembly formed by the main side faces (3) and (4) and the bottom (2), as already stated, by interlocking or fitting, and then by reversible fixing by means of screws or fasteners (16) produced from injected plastic, these being described in more detail later, which interact with orifices (18) and (19) made, on the one hand, on the side uprights of said secondary side faces (5) and (6) and, on the other hand, on the side ends of said main side faces (3) and (4).

Figure 6:
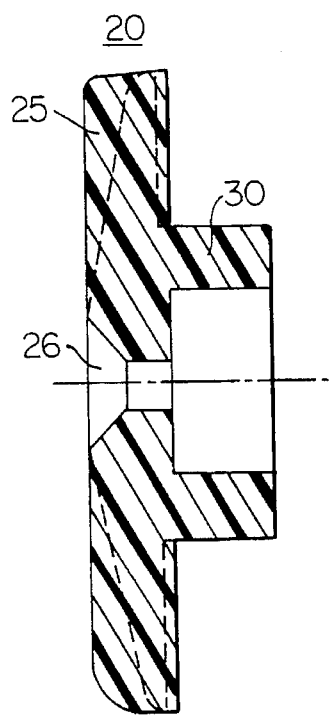
FIG. 6 is a view in longitudinal section.
Figure 7:
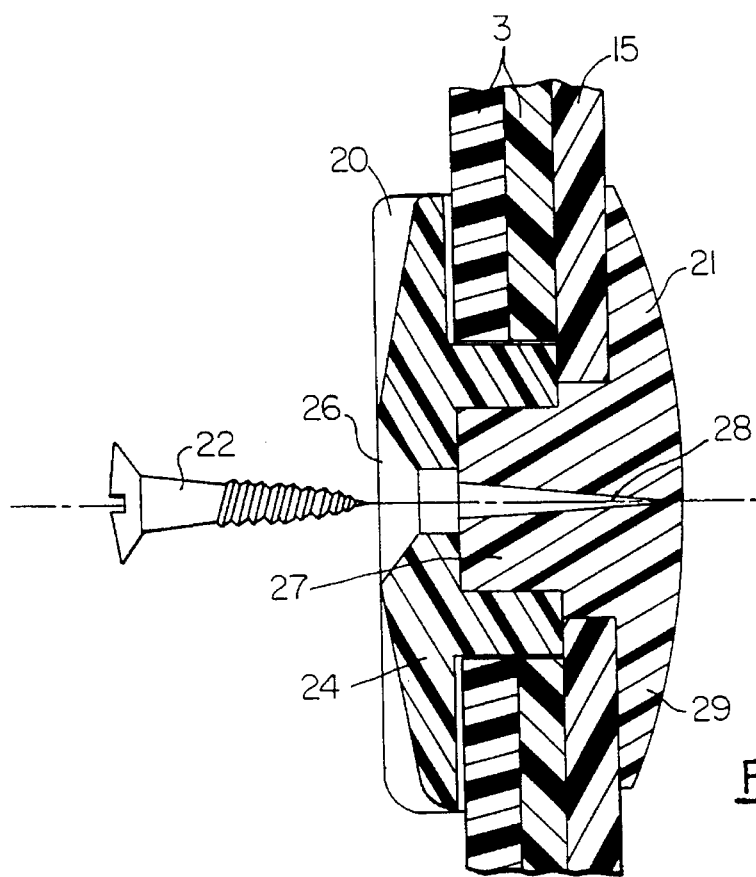
FIG. 7 is a diagrammatic representation of the reversible assembly of two of the faces of the package of the invention.

The fasteners (16), described in connection with FIGS. 5 to 7, are each formed by two pieces (20, 21), produced from injected plastic, located on either side of the faces to be reversibly secured, and joined together by means of a screw (22), itself secured during assembly to the female piece (20). Said pieces (20, 21) pass through the perforations (18, 19) produced in the faces to be assembled.

The female piece (20), described in more detail in connection with FIGS. 5 and 6, is made as a single piece and includes a circular washer (23) intended to bear on the outside of one of the faces (3) to be assembled, surmounted by a substantially lozenge-shaped relief part (24), coaxial with the center of the washer (23), and itself comprising a linear projection (25) extending along the major axis of the lozenge-shaped part (24). This linear projection (25) is intended to promote pivoting of the entire female piece (20), during the step of securing or of unsecuring the faces in question of the package of the invention. Furthermore, this linear projection (25) is interrupted in the middle of it, corresponding in fact to the center of the washer (23), by an orifice (26) intended to receive the screw (22) during the production of said female piece. Finally, the washer (23) is extended at its other face by a cylindrical shaft (30) coaxial with the center of the washer (23) and intended to be inserted into the orifice (19) of the faces to be assembled.

The male piece (21), which may be seen in FIG. 7, also includes a circular washer (29), intended to bear on the inside of the other face (15) to be assembled. This washer (29) is extended by a substantially cylindrical portion (27) coaxial with the center of the washer (29) and intended, on the one hand, to be inserted into the orifice (18, 19) of the faces to be assembled and, on the other hand, to be interlocked in the shaft (30) of the female part (20). This portion is furthermore pierced by a tapped hole (28), coaxial with the portion (27), so as to interact with the screw (22) secured to said female part. Thus, simply by a quarter of a turn of the female part (20), said male and female parts are secured to each other as are, consequently, the faces of the package which they trap between their respective washers.

These fasteners (16) in fact form a pivoting system making it possible to result in a locking effect by pressing the end walls (3, 4) against the side faces (5, 6). The number of fasteners is eight for the entire package, it being well understood that this number may be changed depending on the desired degree of tightness with respect to trickling.

According to another characteristic of the invention, the lid (7) interlocks beneath the assembly formed by the subassembly (3, 4, 2) and the interlocking of the secondary end walls (5) and (6). In other words, the lid (7) confers stability on the package thus assembled.

According to another characteristic of the invention, the lid (7) receives elements (9), each receiving two or three cups (10), these elements being produced, especially, from polypropylene by thermoforming. These elements (9) are attached, especially by gluing, to the upper face of the lid (7) and are uniformly distributed in such a way as to interact with the feet (8) of a package being stacked from above.

The package thus produced is folded up in a very simple manner. First of all, the lid (7) is retracted and then the two secondary end walls (5) and (6) are removed after pivoting the fasteners (16), which side faces (5, 6) are then positioned flat, level with the bottom (2), and then the side faces (3) and (4) are folded over onto them, this folding-over being possible because of the folding zones (11).

Finally, the lid is positioned on the assembly thus obtained, this being advantageously secured by means of belts (17) or equivalent system, as represented in FIG. 3.

According to a modified form of the package of the invention, an approximately 2-centimeter thick sheet of expanded polystyrene, or an expanded-polystyrene/Mylar (registered trade mark) complex, is glued to the inner face of the elements (3, 4, 5, 6), of the bottom (2) and of the lid (7), so as to confer isothermal properties on the package.

In fact, the overall benefit of such a container, given its re-usable and stackable character and its ability to be folded up, and made of a plastic, especially polypropylene, whose innocuousness has major advantages from the environmental standpoint, as soon as it is desired to eliminate them, may be appreciated. The great simplicity of implementation, especially for assembling or dismantling this package, may also be appreciated, rendering it particularly suitable for the transportation of any merchandise with reduced costs.

We claim:

1. A multipurpose plastic container that is foldable into a compact unit, that includes:

a subassembly containing a base wall and two opposed side walls formed from a single sheet of plastic, said side walls having fold lines formed in a lower section so that a top section of one side wall can be folded inward along the fold line and the top section of the other side wall can be folded inward along the fold line over the top section of the one side wall to collapse the subassembly, a pair of reversible plastic end walls each of said end walls having a flange along its edges constructed by folding back said edges upon themselves to provide additional reinforcement to said container to prevent the container from buckling, said end walls having vertically disposed plastic corner pieces attached to said end walls to provide additional support to the container;

means for interlockably joining said pair of reversible plastic end walls to said subassembly, said end wall being capable of being stored under said subassembly where the subassembly is collapsed, a removable plastic lid, means for interlockably joining said plastic lid to the side walls and end walls to form a closed container, said lid being further constructed such that said lid fits over said collapsed subassembly to close the collapsed subassembly in a condition for storage.

2. The container of claim 1 that further includes removable fasteners for securing the end walls to the side walls.

3. The container of claim 2 wherein the removable fasteners each includes a male piece and a female piece for receiving a male therein.

4. The container of claim 3 wherein the female piece includes:

a circular washer for bearing on the outside of one of the walls to be assembled said washer and said walls having orifices therein, a substantially lozenge-shaped relief part, surmounting the washer and coaxial with the later, and further including a linear projection extending along the major axis of the lozenge-shaped part, said projection being intended to promote pivoting of the entire female piece, when securing or unsecuring the walls of the container, said projection being interrupted in the middle of said projection, corresponding to the center of the washer orifice intended to receive a securing screw during the production of said female piece, a cylindrical shaft extending the washer at its other face and being coaxial with the center of the latter, said shaft being intended to be inserted into the orifice of the walls to be assembled;

the male piece includes:

a circular washer intended to bear on the inside of the other wall to be assembled, a substantially cylindrical portion extending the washer and being coaxial with the center of it, said portion being intended, on the one hand, to be inserted into the orifice of the walls to be assembled and, on the other hand, to be interlocked in the shaft of the female part, said portion being furthermore pierced by a tapped hole, coaxial with the portion, so as to interact with the screw secured to said female part.

5. The container of claim 1 further including spaced apart legs secured to said base wall.

6. The container of claim 5 wherein said lid further includes a series of spaced apart members secured to the top surface thereof each member further having cups for receiving therein the legs of a second container wherein one container can be securely stacked on top of another container.

7. The container of claim 1 wherein the inside surfaces of the subassembly, the end walls and the lid are coated with an isothermal lining.

8. The container of claim 7 wherein the liner is formed of a expanded polystyrene and a film of a dielectric plastic thereover.

* * * * *